(No Model.) 2 Sheets—Sheet 1.
J. N. BAKER.
POTATO DIGGER.
No. 424,531. Patented Apr. 1, 1890.
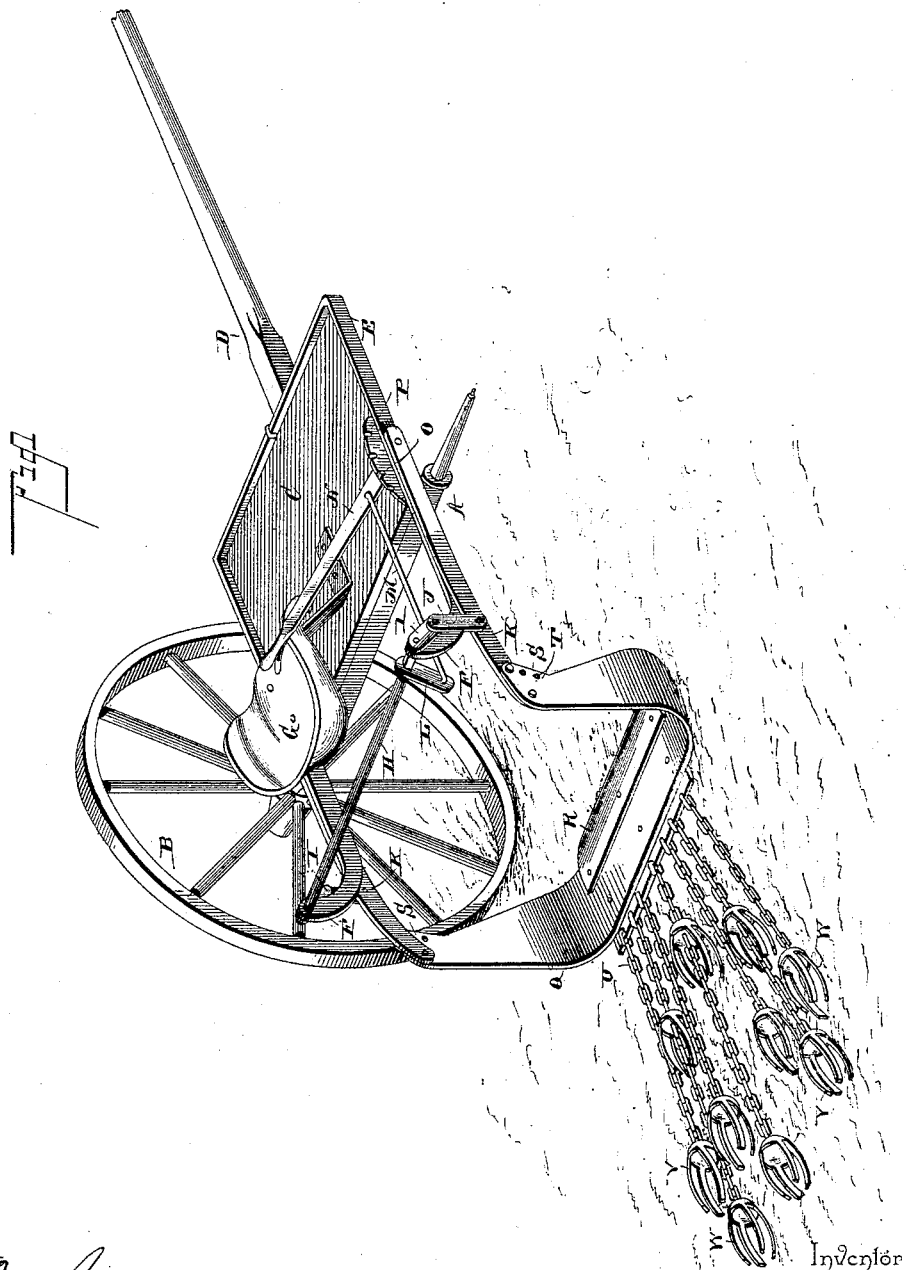
Witnesses
John Smirie
E. J. Siggers
By his Attorneys,
C. A. Snow & Co.
Inventor
John N. Baker (No Model.) 2 Sheets—Sheet 2.
J. N. BAKER.
POTATO DIGGER.
No. 424,531. Patented Apr. 1, 1890.
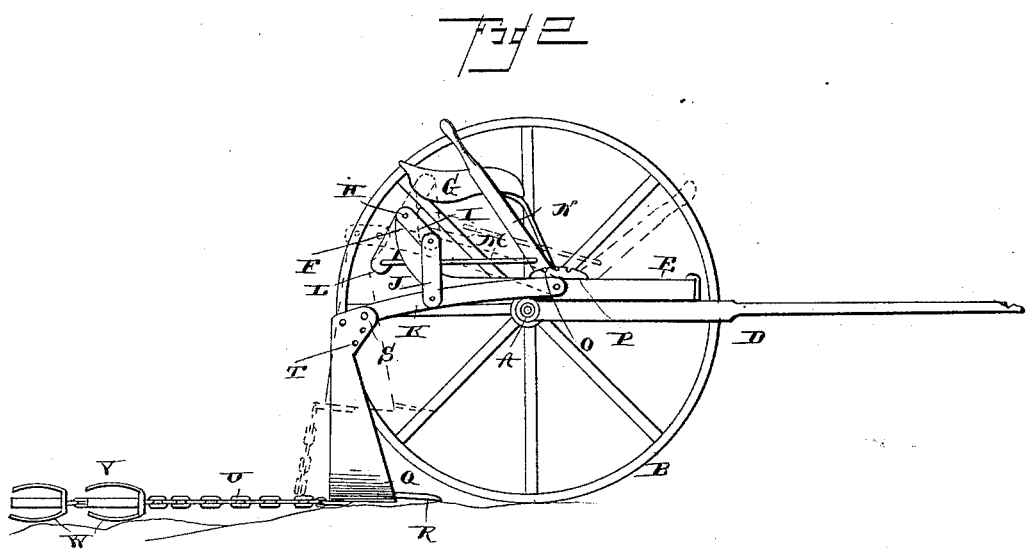
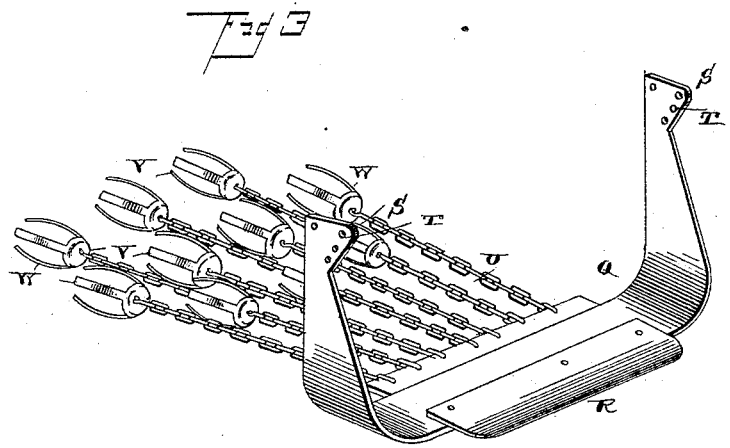
Witnesses
John Smire
E. J. Siggers
By his Attorneys,
C. A. Snow & Co.
Inventor
John N. Baker

UNITED STATES PATENT OFFICE.

JOHN NEWTON BAKER, OF JAGGER, OHIO.

POTATO-DIGGER.

SPECIFICATION forming part of Letters Patent No. 424,531, dated April 1, 1890.

Application filed August 28, 1889. Serial No. 322,214. (No model.)

*To all whom it may concern:*

Be it known that I, JOHN NEWTON BAKER, a citizen of the United States, residing at Jagger, in the county of Hardin and State of Ohio, have invented a new and useful Potato-Digger, of which the following is a specification.

My invention relates to improvements in potato-diggers; and it consists in certain novel features hereinafter described and claimed.

In the accompanying drawings, Figure 1 is a perspective view. Fig. 2 is a side view with the near wheel removed, the plow or shovel being shown lowered in full lines and raised in dotted lines. Fig. 3 is a detail view.

The frame of my improved potato-digger consists of the axle A, on which the carrying-wheels B are mounted, the platform C, secured to the axle and projecting forward therefrom, the tongue D, secured to the axle and the platform, and the rim or guard E, which is secured to the platform and projects rearward therefrom, thereby providing the bearing-arms F. The driver's seat G is mounted on the platform in the usual manner. A rock-shaft H is journaled in the bearing-arms F, and is provided at its ends with the crank-arms I, to which I pivot the upper ends of the links J, the lower ends of which are pivoted to the vibratory arms K, which are pivoted at their front ends to the edges of the platform or the guard E, and have the plow or shovel pivoted to their rear ends. The rock-shaft is further provided near one end with a crank-arm L, which is connected by a pitman M with the lever N, the said lever being fulcrumed on the platform and provided with a spring-bolt O, adapted to engage a locking-plate P at the side of the platform.

The plow or shovel Q is substantially U shape, and is provided at the center of its front edge with a blade or knife R, as clearly shown. The upper ends of the plow are pivoted to the rear ends of the arms K, and are provided with the forwardly-extending projections S, having a series of openings T near their front edges, through any one of which and a suitable opening in the arms K securing-pins are passed to secure the shovel at any desired angle, as will be readily understood. To the rear edge of the plow I secure a series of chains U, which extend rearward from the plow and are adapted to run over the ground when the machine is in use. These chains are provided at various points with the agitators V, consisting of vertically-disposed disks and fingers W, projecting rearwardly from the said disks.

In practice the machine is drawn along the field in the usual manner, and the plow or shovel passes into the ground and along the row of potatoes, so as to unearth the potatoes. The potatoes will pass over the shovel and onto the chains. The screen formed by the chains will be agitated as it is drawn over the surface of the ground, and the dirt will thus be separated from the potatoes, so that the potatoes can be easily gathered. The shovel can be readily adjusted to run at a greater or less depth by throwing the lever N forward or rearward, as may be desired, and when the machine is not in use the shovel can be lifted entirely from the ground, as will be readily understood upon reference to Fig. 2. The chains which form the screen allow the dirt to pass readily through and be separated from the potatoes, while the agitators on the chains throw the potatoes to one side.

The device is very simple and its advantages are thought to be obvious.

Having thus described my invention, what I claim, and desire to secure by Letters Patent, is—

1. In a potato-digger, the combination of the axle, the frame mounted on the same and having rearward-extending arms, the rock-shaft journaled in said arms and having arms or cranks secured thereto, the arms pivoted to the sides of the platform, the shovel secured to said arms, the drag-chains secured to the shovel and having the agitators, and means for operating the rock-shaft to raise or lower the shovel, substantially as set forth.

2. As an improvement in potato-diggers, the combination of the axle, the frame or platform mounted upon the same, the arms pivoted to the sides of said frame or platform, the U-shaped shovel secured to said arms and having a knife or cutter secured to its front edge, and having drag-chains provided with agitators secured to its rear edge, and means, substantially as described, for adjusting the pivoted arms carrying the shovel, as set forth.

In testimony that I claim the foregoing as my own I have hereto affixed my signature in presence of two witnesses.

JOHN NEWTON BAKER.

Witnesses:
A. BEACHER,
G. LAWRENCE.